United States Patent
Valentin

(10) Patent No.: US 11,319,173 B2
(45) Date of Patent: May 3, 2022

(54) SYSTEM FOR PREVENTING SEMITRAILER COLLISIONS WITH A LOADING RAMP

(71) Applicant: JVJ Maskinteknik ApS, Sonderborg (DK)

(72) Inventor: Jan Valentin, Sonderborg (DK)

(73) Assignee: JVJ MASKINTEKNIK APS

( * ) Notice: Subject to any disclaimer, the term of this patent is extended or adjusted under 35 U.S.C. 154(b) by 140 days.

(21) Appl. No.: 16/762,182

(22) PCT Filed: Sep. 19, 2018

(86) PCT No.: PCT/EP2018/075294
§ 371 (c)(1),
(2) Date: May 7, 2020

(87) PCT Pub. No.: WO2019/091644
PCT Pub. Date: May 16, 2019

(65) Prior Publication Data
US 2020/0354176 A1 Nov. 12, 2020

(30) Foreign Application Priority Data
Nov. 7, 2017 (DK) ............................ PA 2017 70833

(51) Int. Cl.
*E01D 1/00* (2006.01)
*B65G 69/28* (2006.01)
*B65G 69/00* (2006.01)

(52) U.S. Cl.
CPC ....... *B65G 69/2882* (2013.01); *B65G 69/005* (2013.01)

(58) Field of Classification Search
None
See application file for complete search history.

(56) References Cited

U.S. PATENT DOCUMENTS 2,723,005 A * 11/1955 Wink ................. B60T 3/00
188/32
5,553,987 A 9/1996 Ellis
(Continued)

FOREIGN PATENT DOCUMENTS

| DE | 19706326 C1 | 10/1998 |
| EP | 2380833 A1 | 10/2011 |

(Continued)

OTHER PUBLICATIONS

Danish Search Report, Application No. PA 2017 70833, completed May 9, 2018, 4 pages.
(Continued)

*Primary Examiner* — Thomas B Will
*Assistant Examiner* — Katherine J Chu
(74) *Attorney, Agent, or Firm* — Ware, Fressola, Maguire & Barber LLP

(57) ABSTRACT

The present invention relates to a system for preventing semitrailer collisions with a loading ramp (10). The system comprises a sensor (100) and guide block (200). The sensor (100) is configured for sensing when the rear end of a semitrailer (12) is approaching a loading ramp (10). The guide block (200) is adapted to be positioned on the ground, and is here shown positioned laterally to the opening of the loading ramp (10). The guide block (200) comprises wheel blocking means (210) configured for supporting the tread of a rear tire of the semitrailer (12). The wheel blocking means (210) is configured to move from a forwarded position relative to the loading ramp (10) to a retracted position relative to the loading ramp (10) as the semitrailer (12) is reversing towards said loading ramp (10). The sensor (100) is configured to send a blocking signal to the guide block (200) when the distance between the rear end of the semitrailer (12) and the loading ramp (10) is below a preset (Continued)

threshold, thereby blocking the movement of the wheel blocking means (210).

5 Claims, 8 Drawing Sheets

(56) References Cited

U.S. PATENT DOCUMENTS

| | | | | |
|---|---|---|---|---|
| 5,582,498 | A * | 12/1996 | Springer | B65G 69/005 |
| | | | | 188/32 |
| 5,803,208 | A * | 9/1998 | Blach | B60T 3/00 |
| | | | | 188/32 |
| 6,082,952 | A | 7/2000 | Alexander | |
| 8,307,956 | B2 * | 11/2012 | Andersen | B65G 69/005 |
| | | | | 188/36 |
| 8,590,674 | B2 * | 11/2013 | Jette | B60T 3/00 |
| | | | | 188/32 |
| 8,857,574 | B2 * | 10/2014 | De Jong | B65G 69/005 |
| | | | | 188/32 |
| 8,869,948 | B2 * | 10/2014 | Saliger | B60T 3/00 |
| | | | | 188/4 R |
| 9,139,384 | B2 * | 9/2015 | Brooks, IV | B65G 69/005 |
| 10,676,295 | B1 * | 6/2020 | Manone | B65G 69/2882 |
| 10,864,895 | B2 * | 12/2020 | Palmer | B60T 3/00 |
| 2003/0111902 | A1 * | 6/2003 | Thiede | B60T 7/22 |
| | | | | 303/193 |
| 2003/0159892 | A1 * | 8/2003 | Jette | B65G 69/005 |
| | | | | 188/32 |
| 2011/0162916 | A1 | 7/2011 | Saliger | |
| 2011/0240416 | A1 * | 10/2011 | Brooks | B65G 69/005 |
| | | | | 188/32 |
| 2012/0006632 | A1 * | 1/2012 | Nelson | B60T 3/00 |
| | | | | 188/32 |
| 2013/0341130 | A1 | 12/2013 | De Jong | |
| 2017/0101278 | A1 * | 4/2017 | Stone | G08B 21/02 |
| 2017/0369042 | A1 * | 12/2017 | Rancourt | B60T 3/00 |
| 2018/0086320 | A1 * | 3/2018 | Jette | B65G 69/005 |
| 2019/0367300 | A1 * | 12/2019 | Mushynski | B65G 69/003 |

FOREIGN PATENT DOCUMENTS

| | | |
|---|---|---|
| EP | 2530038 A1 | 12/2012 |
| WO | 01/43526 A2 | 6/2001 |
| WO | 214125040 A1 | 8/2014 |

OTHER PUBLICATIONS

International Search Report, application No. PCT/EP2018/075294, dated Jan. 22, 2019, 4 pages.
English Abstract, EP 2380833 A1, DEPATISnet Bibliographic data, 2 pages.
English Abstract, DE 197 06 326 C1, DEPATISnet Bibliographic data, 2 pages.
Written Opinion of the ISA, application No. PCT/EP2018/075294, dated Jan. 22, 2019, 6 pages.

* cited by examiner

SYSTEM FOR PREVENTING SEMITRAILER COLLISIONS WITH A LOADING RAMP

TECHNICAL FIELD OF THE INVENTION

The present invention relates to systems for preventing semitrailer collisions with loading ramps.

BACKGROUND OF THE INVENTION

Loading ramps are generally designed to receive a semitrailer with the rear end first. Hence, the driver of the semitrailer will have to reverse the semitrailer towards the loading ramp. Optical devices are often present at the loading ramp to alert the driver when he is in place in front of the loading ramp. However, for some reason, sometimes the driver does not pay attention to the warning signal, and the semitrailer collides with the loading ramp. Since many types of semitrailers arrive at a loading ramp each day, it is difficult to position a physical stop in front of the rear wheels of the semitrailer. The distance between the rear wheels and the rear end of the semitrailer simply varies too much from one type of semitrailer to another.

SUMMARY OF THE INVENTION

It is an object of the present invention to overcome the above-mentioned problems.

One aspect relates to a system for preventing semitrailer collisions with a loading ramp comprising:
  a sensor configured for sensing when the rear end of a semitrailer is approaching a loading ramp; and
  a guide block adapted to be positioned on the ground, laterally and/or medially to the opening of the loading ramp; wherein the guide block comprises wheel blocking means or a wheel blocker configured for supporting the tread of a rear tire of the semitrailer, and configured to move from a forward position relative to the loading ramp to a retracted position relative to the loading ramp as the semitrailer is reversing towards said loading ramp;
wherein the sensor is configured to send a blocking signal to the guide block when the distance between the rear end of the semitrailer and the loading ramp is below a preset threshold, thereby blocking the movement of the wheel blocking means or wheel blocker.

Another aspect relates to a system for preventing semitrailer collisions with a loading ramp comprising:
  a sensor configured for sensing when the rear end of a semitrailer is approaching a loading ramp; and
  a guide block adapted to be positioned on the ground, laterally and/or medially to the opening of the loading ramp; wherein the guide block comprises wheel blocking means or a wheel blocker configured for supporting the tread of a rear tire of the semitrailer, and configured to move from a forward position relative to the loading ramp to a retracted position relative to the loading ramp as the semitrailer is reversing towards said loading ramp;
wherein the sensor is configured to send a blocking signal to the guide block when the distance between the rear end of the semitrailer and the loading ramp is below a preset threshold, thereby blocking the movement of the wheel blocking means or wheel blocker;
wherein the wheel blocking means or wheel blocker is connected to a first locking means or mechanical locking movement comprising two or more parts such as a first toothed rack, and a first locking pin; and wherein the first locking pin is configured to engage with the first toothed rack upon receipt, either directly or indirectly, of a blocking signal from a sensor or a switch.

In principle, the wheel blocking means or wheel blocker is initially positioned at an extended position relative to the loading ramp, where the rear end of the semitrailer is at no risk of colliding with the loading ramp. The semitrailer is reversed until its rear wheel at the driver side reaches the wheel blocking means or wheel blocker. The driver then continues to reverse the semitrailer as the wheel blocking means or wheel blocker continuously supports the rear wheel in a retractive movement, relative to the loading ramp, until the sensor sends a blocking signal to the guide block when the distance between the rear end of the semitrailer and the loading ramp is below a preset threshold. In response to the blocking signal, the wheel blocking means or wheel blocker locks its position, and the driver will feel that the semitrailer has been braked. He then knows that the semitrailer is in position. Thereby, the semitrailer will never risk colliding with the loading ramp, and the solution is independent on the type of semitrailer.

The sensor configured for sensing when the rear end of a semitrailer is approaching a loading ramp is preferably a distance sensor. The term "distance sensor" for the purposes of this invention is not limited to any particular type but can for instance be any one or more of an infrared sensor, a triangulation sensor, an ultrasonic sensor, or the like, or combinations thereof.

In one or more embodiments, the wheel blocking means or wheel blocker is configured such that the work of the rear wheel of the semitrailer on the wheel blocking means or wheel blocker makes the wheel blocking means or wheel blocker move from a forward position relative to the loading ramp to a retracted position relative to the loading ramp. Hence, it is only the force of the reversing semitrailer that moves the wheel blocking means or wheel blocker from a forward position to a retracted position. Such a specific configuration could e.g. be that the wheel blocking means or wheel blocker is connected to a locking means or locking movement comprising for instance a toothed rack, and a locking pin; and wherein the locking pin is configured to engage with the toothed rack upon receipt, either directly or indirectly, of a blocking signal from a sensor. The toothed rack is preferably positioned along the length of the guide block. The locking pin will then be in a retracted position until the blocking signal is received. In one or more embodiments, the wheel blocking means or whell blocker is configured as a sled.

In one or more embodiments, the wheel blocking means or wheel blocker comprises a plate adapted for supporting a tire of a semitrailer.

In one or more embodiments, the wheel blocking means or wheel blocker is configured as a sled with a) a distal end, relative to the loading ramp, configured substantially plane, relative to the ground surface; b) a substantially plane or concave, relative to the ground surface, middle segment; and c) a proximal end, relative to the loading ramp, configured as an elevation, relative to the ground surface, adapted for supporting the tread of a rear tire of the semitrailer.

In one or more embodiments, the wheel blocking means or wheel blocker is configured as a sled with a) a distal end, relative to the loading ramp, configured as a ramp; b) a substantially plane, relative to the ground surface, middle segment or a concave, relative to the ground surface, segment; and c) a proximal end, relative to the loading ramp, configured as an elevation adapted for supporting the tread of a rear tire of the semitrailer.

In one or more embodiments, the guide block further comprises a wheel chock system adapted for blocking a tire of a semitrailer; wherein the wheel chock system comprises a guide rail adapted for supporting the sled, and a wheel support integrated into the ramp of the wheel blocking means or wheel blocker; said wheel support adapted to slidably or rollably engage with said guide rail; and wherein when the wheel support engages with said guide rail it moves from a retracted position to an elevated position.

In one or more embodiments, the guide block further comprises a wheel chock system adapted for blocking a tire of a semitrailer wherein the wheel chock system comprises a guide rail adapted for supporting the sled, and a wheel support integrated into the ramp of the wheel blocking means or wheel blocker; said wheel support adapted to slidably or rollably engage with said guide rail; wherein the guide rail is configured with one or more elevations along its path; and wherein when the wheel support engages with said elevations it moves from a retracted position to an elevated position.

In one or more embodiments, the wheel blocking means or wheel blocker is slidably connected to a guide rail.

In one or more embodiments, the wheel blocking means or wheel blocker is connected to a second locking means or mechanical locking movement comprising for instance a second toothed rack, and a second locking pin; and wherein the second locking pin is configured to engage with the second toothed rack upon receipt, either directly or indirectly, of a blocking signal, e.g. from a sensor or a switch. In this way, the wheel blocking means or wheel blocker may be blocked in both directions.

In one or more embodiments, the first toothed rack and the second toothed rack have serrated teeth with opposite inclinations relative to the length of the racks.

In one or more embodiments, the first toothed rack and the second toothed rack are positioned next to each other.

In one or more embodiments, the sled is connected to a locking means or mechanical locking movement comprising a toothed rack, and a locking pin; and wherein the locking pin is configured to engage with the toothed rack upon receipt, either directly or indirectly, of a blocking signal from a sensor.

The blocking signal may be transmitted by wires or wirelessly.

In one or more embodiments, the sled is connected to a locking pin housing adapted to move the locking pin above and along the toothed rack.

In one or more embodiments, the sensor, subsequent to a blocking signal, is configured to send a reactivation signal to the guide block when the distance between the rear end of the semitrailer and the loading ramp exceeds a preset threshold, thereby reactivating the guide block to move from a retracted position relative to the loading ramp to a forward position relative to the loading ramp.

In one or more embodiments, the guide block comprises a sensor configured for sensing when the semitrailer has disengaged therefrom; and wherein the sensor is configured to activate the guide block to move from a retracted position relative to the loading ramp to a forward position relative to the loading ramp.

In one or more embodiments, the guide block further comprises a wheel chock system adapted for blocking a tire of a semitrailer. The wheel chock system is activated when the semitrailer is in place relative to the loading ramp, and is deactivated when the semitrailer is ready for departure. Examples of a wheel chock system could be as disclosed in U.S. Pat. No. 6,082,952 (hereby incorporated by reference), where the wheel chock system comprises a blocking means or blocker moving between a forwarded position (activated) and a retracted position (deactivated).

In one or more embodiments, the system further comprises a wheel chock system adapted for blocking a tire of a semitrailer. The wheel chock system is activated when the semitrailer is in place relative to the loading ramp, and is deactivated when the semitrailer is ready for departure. Examples of a wheel chock system could be as disclosed in U.S. Pat. No. 5,553,987 (hereby incorporated by reference), comprising an engaging mechanism for initially engaging a tire of a vehicle as said tire rolls toward a dock position, a chock mechanism for chocking the tire that may be activated once the tire is engaged by the engaging mechanism, and a connector connecting said engaging mechanism and said chock mechanism to move them together toward said dock position in response to the rolling motion of the tire.

A second aspect relates to a guide block for use in a system according to the present invention, the guide block being adapted to be positioned on the ground, laterally and/or medially to the opening of a loading ramp; wherein the guide block comprises wheel blocking means or a wheel blocker configured for supporting the tread of a rear tire of a semitrailer, and configured to move from a forward position relative to the loading ramp to a retracted position relative to the loading ramp as the semitrailer is reversing towards said loading ramp; wherein the guide block is configured for receiving a blocking signal from a sensor, and in response thereto, configured to block the movement of the wheel blocking means or wheel blocker.

A third aspect relates to the use of a system according to the present invention for preventing semitrailer collisions with a loading ramp.

It should be noted that embodiments and features described in the context of one of the aspects of the present invention also apply to the other aspects of the invention.

DETAILED DESCRIPTION OF THE INVENTION

Figure 1:
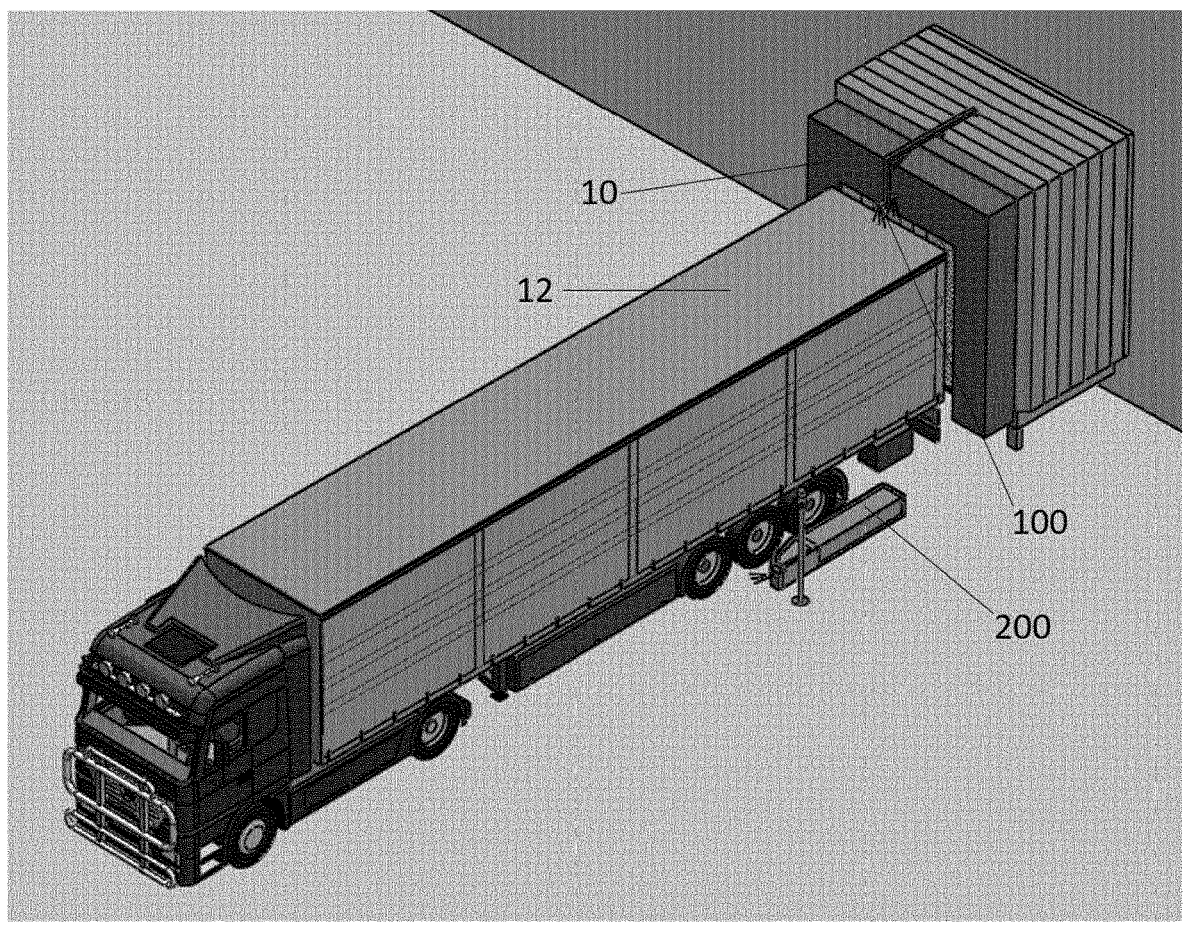
FIG. 1 shows a perspective view of a system in accordance with various embodiments of the invention.

Referring to FIG. 1, the general scheme of the invention is shown in perspective view. FIG. 1 shows a system for preventing semitrailer collisions with a loading ramp 10. The system comprises a sensor 100 and guide block 200. The sensor 100 is configured for sensing when the rear end of a semitrailer 12 is approaching a loading ramp 10. The guide block 200 is adapted to be positioned on the ground and is here shown positioned laterally to the opening of the loading ramp 10. The guide block 200 comprises wheel blocking means or wheel blocker 210 (FIG. 2) configured for supporting the tread of a rear tire of the semitrailer 12. The wheel blocking means or wheel blocker 210 is configured to move from a forward position relative to the loading ramp 10 to a retracted position relative to the loading ramp 10 as the semitrailer 12 is reversing towards said loading ramp 10. The sensor 100 is configured to send a blocking signal to the guide block 200 when the distance between the rear end of the semitrailer 12 and the loading ramp 10 is below a preset threshold, thereby blocking the movement of the wheel blocking means or wheel blocker 210.

Figure 2:
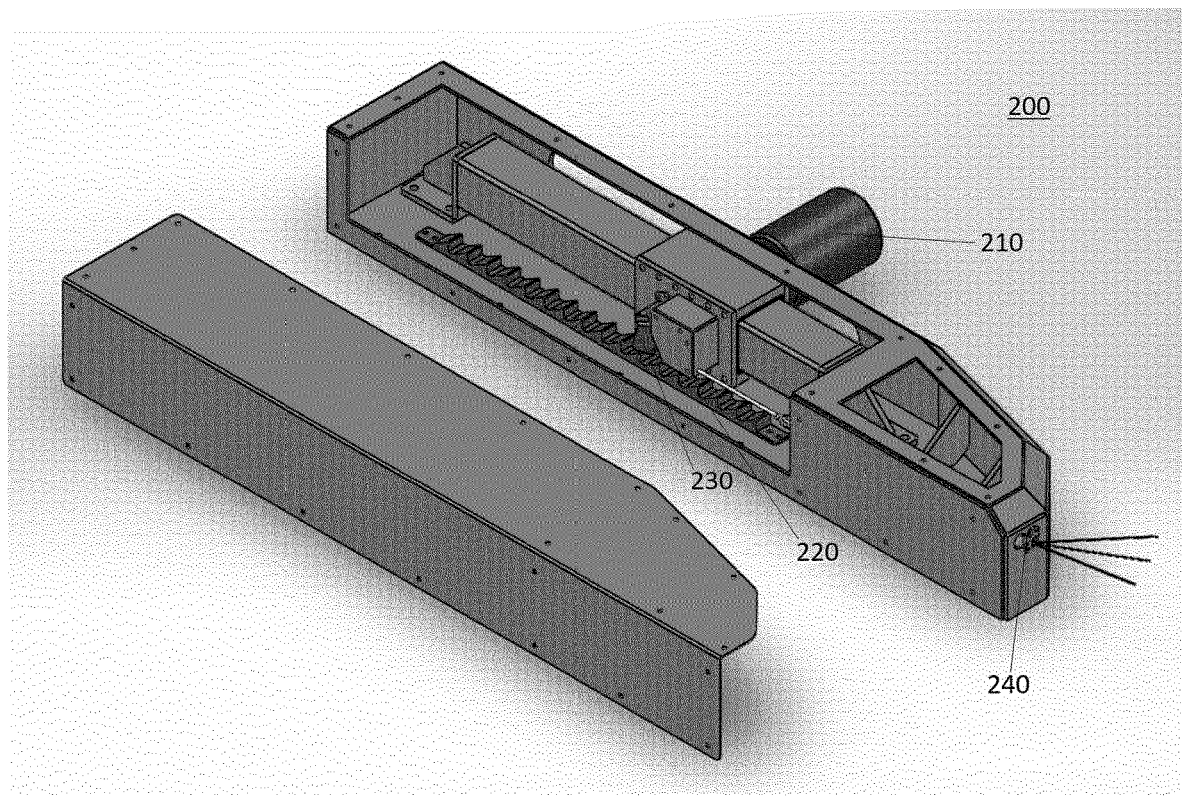
FIG. 2 shows a guide block in accordance with various embodiments of the invention, where the wheel blocking means or wheel blocker is configured as a cylinder.

FIG. 2 shows a guide block 200 in accordance with various embodiments of the invention, where the wheel blocking means or wheel blocker 210 is connected to a locking means or mechanical locking movement comprising for instance a toothed rack 220, and a locking pin 230 as shown. The locking pin 230 is configured to engage with the toothed rack 220 upon receipt, either directly or indirectly, of a blocking signal from a sensor.

Figure 3:
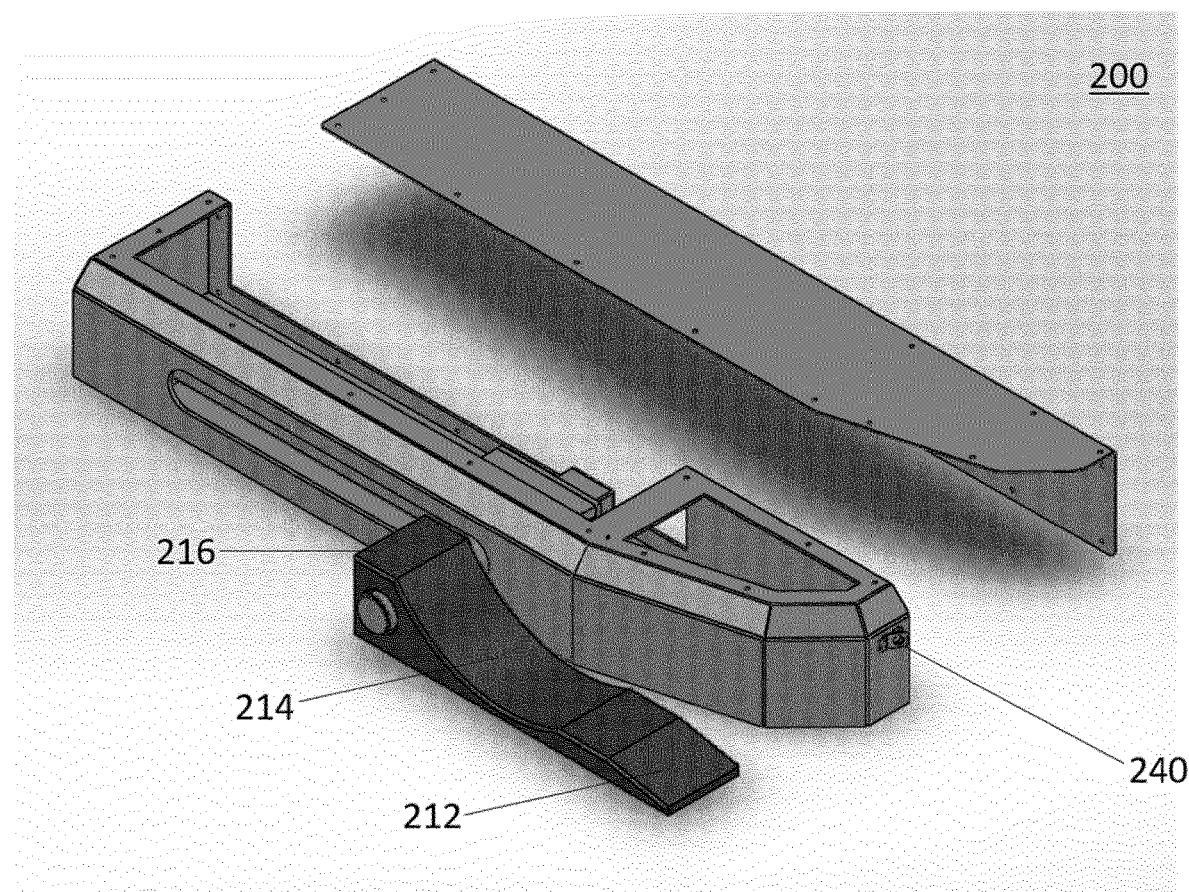
FIG. 3 shows a left-side view of a guide block in accordance with various embodiments of the invention, where the wheel blocking means or wheel blocker is configured as a sled.
Figure 4:
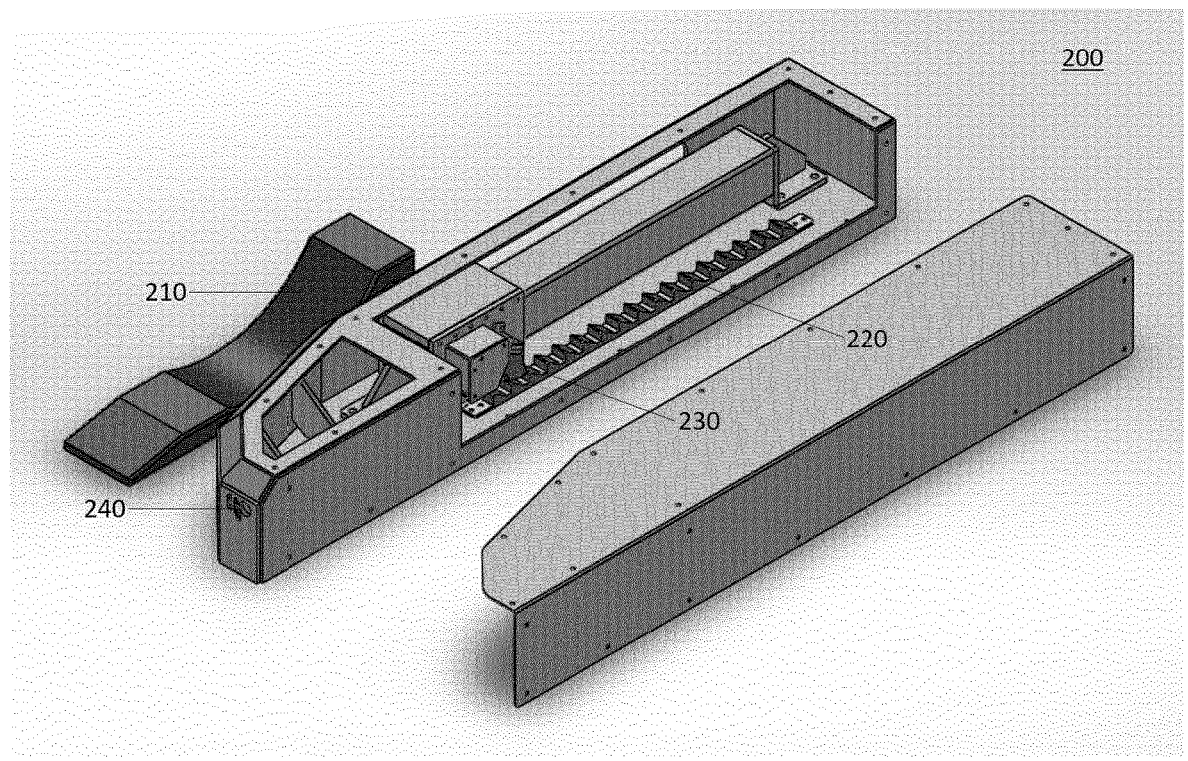
FIG. 4 shows a right-side view of the guide block of FIG. 3.

FIGS. 3 and 4 show a guide block 200 in accordance with various embodiments of the invention, where the wheel blocking means or wheel blocker 210 is configured as a sled. The distal end 212 of the sled is configured as a loading ramp. A middle segment 214 is concave, relative to the ground surface, and the proximal end 216, relative to the loading ramp is configured as an elevation adapted for supporting the tread of a rear tire of the semitrailer.

The sled is connected to a locking means or movement comprising a toothed rack 220, and a locking pin 230 (FIG. 4). The locking pin 230 is configured to engage with the toothed rack upon receipt, either directly or indirectly, of a blocking signal from a sensor.

Figure 5A:
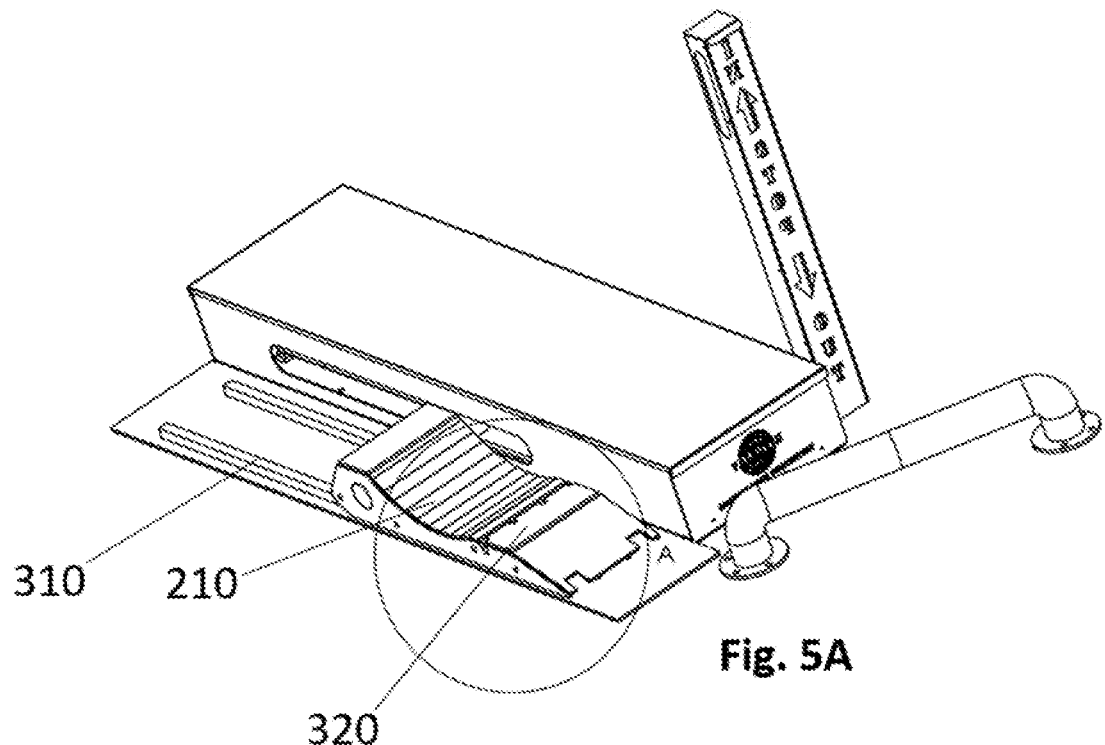
FIG. 5A shows a left side view of a guide block in accordance with various embodiments of the invention, where the guide block further comprises a wheel chock system shown in a retracted position.
Figure 5B:
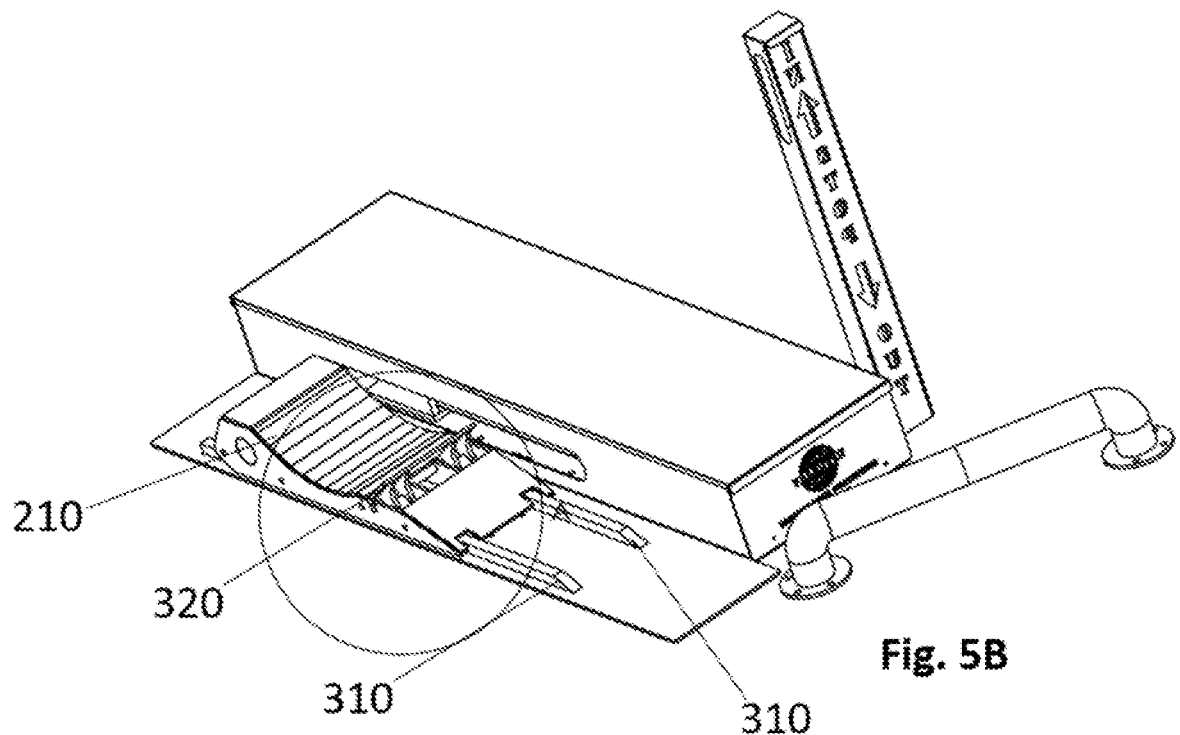
FIG. 5B shows a left side view of a guide block in accordance with various embodiments of the invention, where the guide block further comprises a wheel chock system shown in an elevated position.
Figure 6A:
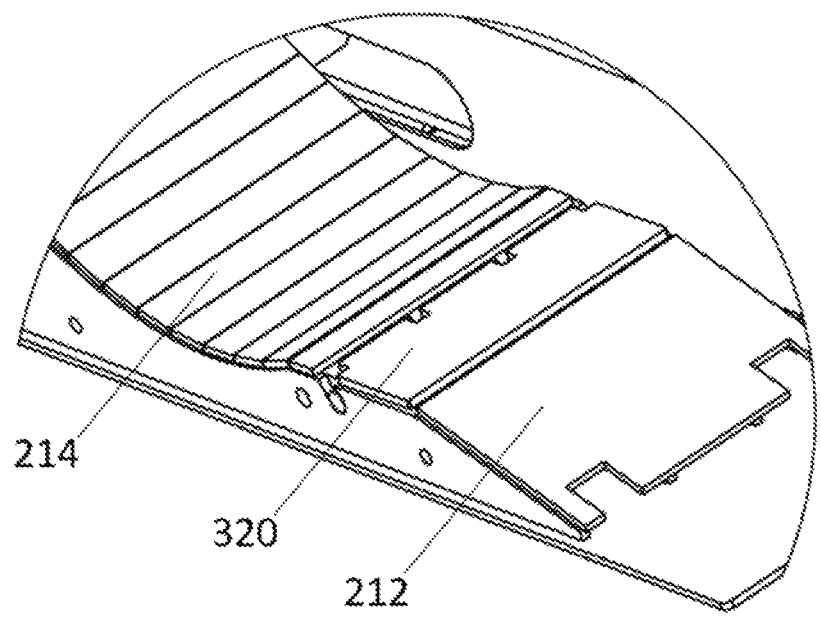
FIG. 6A shows a closeup of the wheel chock system of FIG. 5A.
Figure 6B:
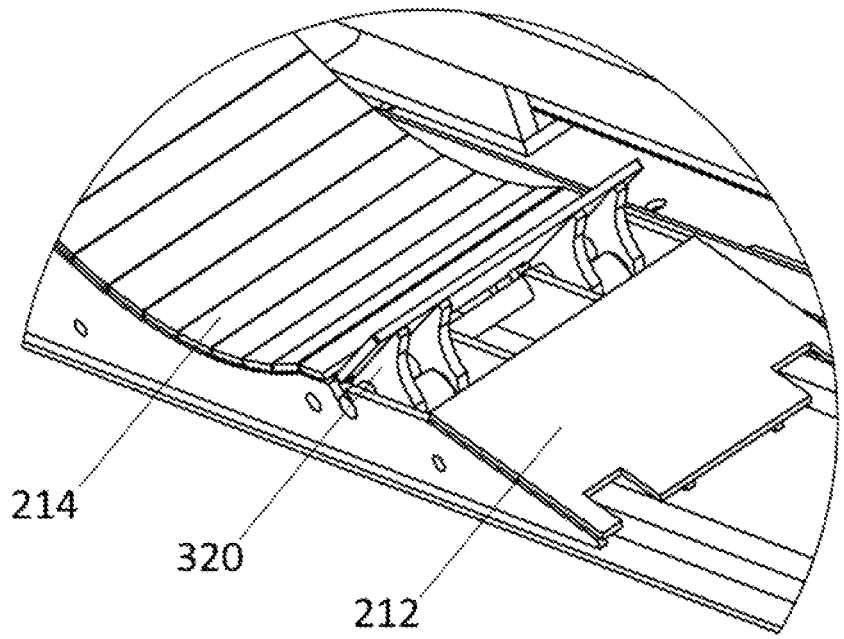
FIG. 6B shows a closeup of the wheel chock system of FIG. 5B.

FIG. 5A shows a left side view of a guide block in accordance with various embodiments of the invention, where the guide block further comprises a wheel chock system shown in a retracted position. The wheel blocking means or blocker 210 is configured as a sled like the one on FIGS. 3 and 4. The wheel chock system comprises a guide rail 310 adapted for supporting the sled, and a wheel support 320 integrated into the ramp of the wheel blocking means 210; said wheel support 320 is adapted to slidably or rollably engage with said guide rail 310; and wherein when the wheel support 320 engages with said guide rail 310 it moves from a retracted position to an elevated position. FIG. 5B shows the wheel chock system in an elevated position. The difference between the retracted and elevated position is better seen in FIGS. 6A and 6B.

Figure 7:
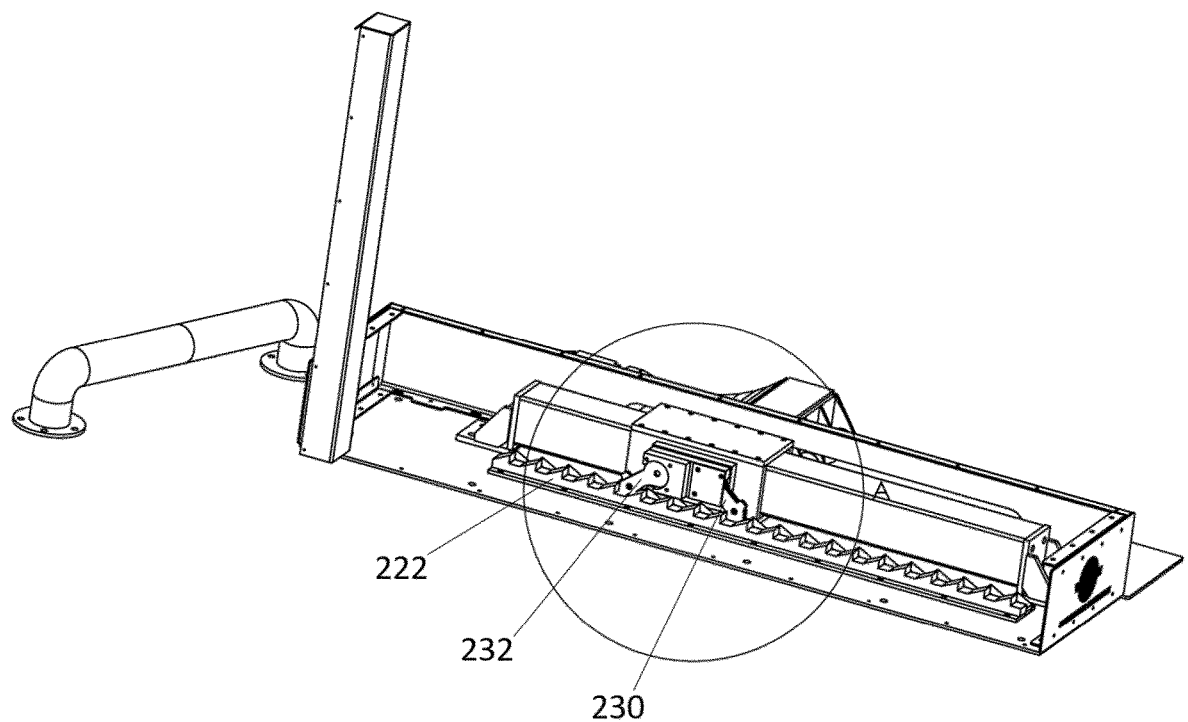
FIG. 7 shows a guide block in accordance with various embodiments of the invention, where the wheel blocking means or wheel blocker is connected to both a first and a second locking means or mechanical locking movement.
Figure 8A:
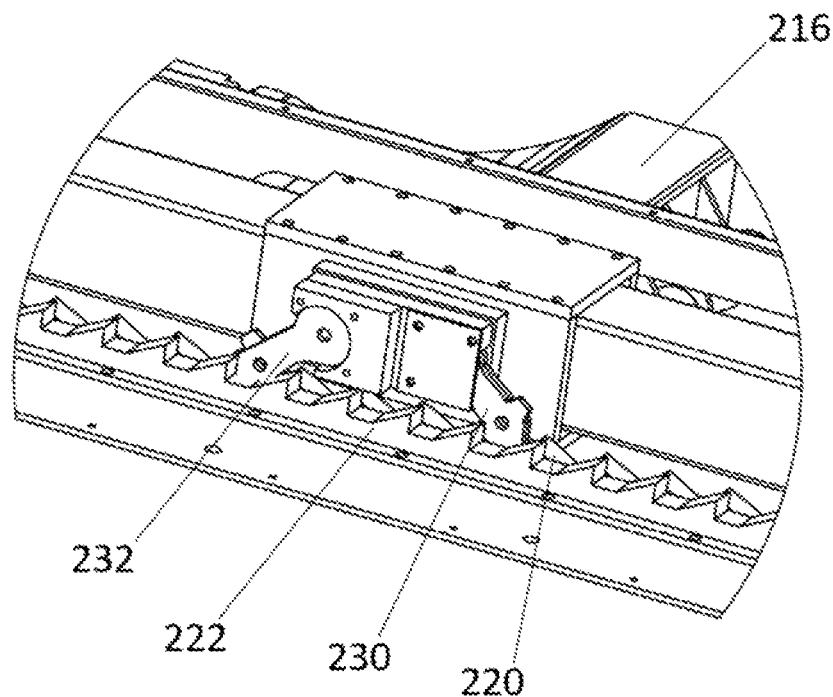
FIG. 8A shows a closeup of the guide block of FIG. 7, where a second locking pin is shown engaged with a second toothed rack.
Figure 8B:
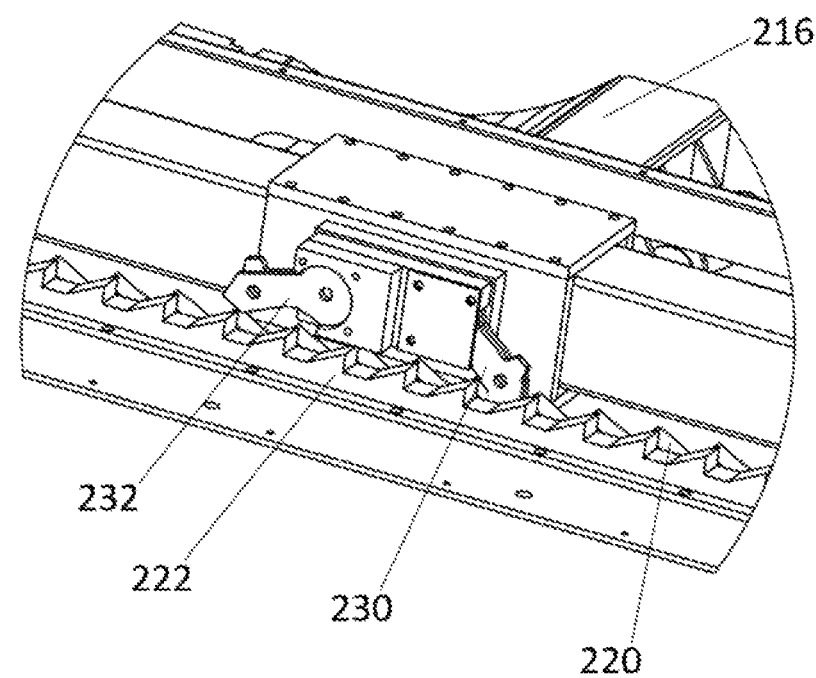
FIG. 8B shows a closeup of the guide block of FIG. 7, where the second locking pin is shown disengaged from the second toothed rack.

FIG. 7 shows a guide block in accordance with various embodiments of the invention, where the wheel blocking means or wheel blocker 210 is connected to both a first and a second locking means or locking movement. Both the first and second locking means or movement comprises for instance a toothed rack 220/222, and a locking pin 230/232. In this example, the first 220 and second 222 toothed racks have serrated teeth with opposite inclinations relative to the length of the racks. The first 220 and second 222 toothed racks are positioned next to each other. FIGS. 8A and 8B show closeups of the guide block of FIG. 7, where a second locking pin 232 is shown engaged and disengaged, respectively, with a second toothed rack 222.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

REFERENCES

10 Loading ramp
12 Semitrailer
100 Sensor
200 Guide block
210 Wheel blocking means or wheel blocker
212 Distal end
214 Middle segment
216 Proximal end
220 First toothed rack
222 Second toothed rack
230 First locking pin
232 Second locking pin
240 Sensor
310 Guide rail
320 Wheel support

The invention claimed is:

1. A system for preventing semitrailer collisions with a loading ramp, the semitrailer comprising a rear end and rear wheels with tires having a tread; the system comprising:
 a sensor configured for sensing when said rear end of said semitrailer is approaching said loading ramp; and
 a guide block adapted to be positioned on the ground, laterally or medially to the opening of said loading ramp; wherein said guide block comprises wheel blocking mechanism configured for supporting said tread of said rear tire(s) of said semitrailer, and configured to move from a forwarded position relative to said loading ramp to a retracted position relative to said loading ramp as said semitrailer is reversing towards said loading ramp;

wherein said sensor is configured to send a blocking signal to said guide block when the distance between said rear end of said semitrailer and said loading ramp is below a preset threshold, thereby blocking the movement of said wheel blocking mechanism;

wherein said system further comprises a first locking apparatus comprising a first toothed rack, and a first locking pin; and wherein the first locking pin is configured to engage with the first toothed rack upon receipt, either directly or indirectly, of a blocking signal from said sensor or a switch; wherein said wheel blocking mechanism is connected to said first locking apparatus, and wherein said guide block further comprises a wheel chock system adapted for blocking said tire of said semitrailer; wherein said wheel blocking mechanism is configured as a sled with a) a distal end, relative to said loading ramp, configured as a ramp; b1) a substantially plane, relative to said ground surface, middle segment or b2) a concave, relative to said ground surface, middle segment; and c) a proximal end, relative to said loading ramp, configured as an elevation adapted for supporting said tread of said rear tire of said semitrailer; wherein said wheel chock system comprises a guide rail adapted for supporting said sled, and a wheel support integrated into said ramp of said wheel blocking mechanism; said wheel support adapted to slidably or rollably engage with said guide rail; and wherein when the wheel support engages with said guide rail it moves from a retracted position to an elevated position.

2. A system for preventing semitrailer collisions with a loading ramp, the semitrailer comprising a rear end and rear wheels with tires having a tread; the system comprising:
   a sensor configured for sensing when said rear end of said semitrailer is approaching said loading ramp; and
   a guide block adapted to be positioned on the ground, laterally or medially to the opening of said loading ramp; wherein said guide block comprises wheel blocking mechanism configured for supporting said tread of said rear tire(s) of said semitrailer, and configured to move from a forwarded position relative to said loading ramp to a retracted position relative to said loading ramp as said semitrailer is reversing towards said loading ramp;

wherein said sensor is configured to send a blocking signal to said guide block when the distance between said rear end of said semitrailer and said loading ramp is below a preset threshold, thereby blocking the movement of said wheel blocking mechanism;

wherein said system further comprises a first locking apparatus comprising a first toothed rack, and a first locking pin; and wherein the first locking pin is configured to engage with the first toothed rack upon receipt, either directly or indirectly, of a blocking signal from said sensor or a switch; wherein said wheel blocking mechanism is connected to said first locking apparatus, wherein said guide block further comprises a wheel chock system adapted for blocking said tire of said semitrailer; wherein said wheel blocking mechanism is configured as a sled with a) a distal end, relative to said loading ramp, configured as a ramp; b1) a substantially plane, relative to said ground surface, middle segment or b2) a concave, relative to said ground surface, middle segment; and c) a proximal end, relative to said loading ramp, configured as an elevation adapted for supporting said tread of said rear tire of said semitrailer; wherein the wheel chock system comprises a guide rail adapted for supporting the sled, and a wheel support integrated into the ramp of the wheel blocking mechanism; said wheel support adapted to slidably or rollably engage with said guide rail; wherein the guide rail is configured with one or more elevations along its path; and wherein when the wheel support engages with said elevations it moves from a retracted position to an elevated position.

3. A system for preventing semitrailer collisions with a loading ramp, the semitrailer comprising a rear end and rear wheels with tires having a tread; the system comprising:
   a sensor configured for sensing when said rear end of said semitrailer is approaching said loading ramp; and
   a guide block adapted to be positioned on the ground, laterally or medially to the opening of said loading ramp; wherein said guide block comprises wheel blocking mechanism configured for supporting said tread of said rear tire(s) of said semitrailer, and configured to move from a forwarded position relative to said loading ramp to a retracted position relative to said loading ramp as said semitrailer is reversing towards said loading ramp;

wherein said sensor is configured to send a blocking signal to said guide block when the distance between said rear end of said semitrailer and said loading ramp is below a preset threshold, thereby blocking the movement of said wheel blocking mechanism;

wherein said system further comprises a first locking apparatus comprising a first toothed rack, and a first locking pin; and wherein the first locking pin is configured to engage with the first toothed rack upon receipt, either directly or indirectly, of a blocking signal from said sensor or a switch; wherein said wheel blocking mechanism is connected to said first locking apparatus, wherein said system further comprises a second locking mechanism comprising a second toothed rack, and a second locking pin; and wherein said second locking pin is configured to engage with said second toothed rack upon receipt, either directly or indirectly, of a blocking signal, from said sensor or a switch; wherein said wheel blocking mechanism is connected to said second locking mechanism; wherein said first and second toothed racks have serrated teeth with opposite inclinations relative to the length of the racks; wherein said first and second toothed racks are positioned next to each other.

4. A system for preventing semitrailer collisions with a loading ramp, the semitrailer comprising a rear end and rear wheels with tires having a tread; the system comprising:
   a sensor configured for sensing when said rear end of said semitrailer is approaching said loading ramp; and
   a guide block adapted to be positioned on the ground, laterally or medially to the opening of said loading ramp; wherein said guide block comprises wheel blocking mechanism configured for supporting said tread of said rear tire(s) of said semitrailer, and configured to move from a forwarded position relative to said loading ramp to a retracted position relative to said loading ramp as said semitrailer is reversing towards said loading ramp;

wherein said sensor is configured to send a blocking signal to said guide block when the distance between said rear end of said semitrailer and said loading ramp is below a preset threshold, thereby blocking the movement of said wheel blocking mechanism;

wherein said system further comprises a first locking apparatus comprising a first toothed rack, and a first locking pin; and wherein the first locking pin is configured to engage with the first toothed rack upon receipt, either directly or indirectly, of a blocking signal from said sensor or a switch; wherein said wheel blocking mechanism is connected to said first locking apparatus, wherein said system further comprises a second locking mechanism comprising a second toothed rack, and a second locking pin; and wherein said second locking pin is configured to engage with said second toothed rack upon receipt, either directly or indirectly, of a blocking signal, from said sensor or a switch; wherein said wheel blocking mechanism is connected to said second locking mechanism; wherein said first and second toothed racks have serrated teeth with opposite inclinations relative to the length of the racks.

5. A system for preventing semitrailer collisions with a loading ramp, the semitrailer comprising a rear end and rear wheels with tires having a tread; the system comprising:

a sensor configured for sensing when said rear end of said semitrailer is approaching said loading ramp; and a guide block adapted to be positioned on the ground, laterally or medially to the opening of said loading ramp; wherein said guide block comprises wheel blocking mechanism configured for supporting said tread of said rear tire(s) of said semitrailer, and configured to move from a forwarded position relative to said loading ramp to a retracted position relative to said loading ramp as said semitrailer is reversing towards said loading ramp;

wherein said sensor is configured to send a blocking signal to said guide block when the distance between said rear end of said semitrailer and said loading ramp is below a preset threshold, thereby blocking the movement of said wheel blocking mechanism;

wherein said system further comprises a first locking apparatus comprising a first toothed rack, and a first locking pin; and wherein the first locking pin is configured to engage with the first toothed rack upon receipt, either directly or indirectly, of a blocking signal from said sensor or a switch; wherein said wheel blocking mechanism is connected to said first locking apparatus, wherein said system further comprises a second locking mechanism comprising a second toothed rack, and a second locking pin; and wherein said second locking pin is configured to engage with said second toothed rack upon receipt, either directly or indirectly, of a blocking signal, from said sensor or a switch; wherein said wheel blocking mechanism is connected to said second locking mechanism; wherein said first and second toothed racks have serrated teeth with opposite inclinations relative to the length of the racks, wherein said first and second toothed racks are positioned next to each other.

* * * * *